(12) United States Patent
Cheng et al.

(10) Patent No.: US 12,528,035 B2
(45) Date of Patent: Jan. 20, 2026

(54) FILTER COMPRISING ROTATING DEVICE

(71) Applicant: ZHEJIANG WEITAI AUTOMOBILE PARTS CO., LTD., Zhejiang (CN)

(72) Inventors: Jianbin Cheng, Huzhou (CN); Yu Zhang, Huzhou (CN); Qinglin Deng, Huzhou (CN); Xiaowei Ying, Huzhou (CN)

(73) Assignee: ZHEJIANG WEITAI AUTOMOBILE PARTS CO., LTD., Huzhou (CN)

( * ) Notice: Subject to any disclaimer, the term of this patent is extended or adjusted under 35 U.S.C. 154(b) by 720 days.

(21) Appl. No.: 17/957,117

(22) Filed: Sep. 30, 2022

(65) Prior Publication Data

US 2024/0109009 A1   Apr. 4, 2024

(51) Int. Cl.
*B01D 29/96* (2006.01)
*B01D 29/13* (2006.01)
*B01D 35/16* (2006.01)

(52) U.S. Cl.
CPC ............. *B01D 29/96* (2013.01); *B01D 29/13* (2013.01); *B01D 35/16* (2013.01); *B01D 2201/0415* (2013.01); *B01D 2201/347* (2013.01)

(58) Field of Classification Search
CPC ........ B01D 29/96; B01D 29/13; B01D 35/16; B01D 2201/0415; B01D 2201/347
See application file for complete search history.

(56) References Cited

U.S. PATENT DOCUMENTS 9,023,203 B2 * 5/2015 Ardes .................. B01D 35/147
210/167.02

* cited by examiner

*Primary Examiner* — Waqaas Ali
(74) *Attorney, Agent, or Firm* — Ladas & Parry LLP

(57) ABSTRACT

The present application relates to the field of fuel filter components of internal combustion engines, and discloses a filter with a rotating device, including a filter element and the rotating device installed on the filter element. The filter element is provided with a clamping structure matched with the rotating device. The rotating device is provided with an eccentrically arranged fuel return plug, an internal opening, and a drive portion structure. By arranging the rotating device, the service life of this filter is prolonged. By forming the internal opening and arranging the fuel return plug, the installation efficiency and convenience of this filter are improved.

6 Claims, 4 Drawing Sheets

FILTER COMPRISING ROTATING DEVICE

FIELD OF TECHNOLOGY

The present application relates to the field of fuel filter components of internal combustion engines, in particular to a filter with a rotating device.

BACKGROUND

In general, a filter is widely used in the field of fuel filtration of internal combustion engines to filter out debris in fuel, and plays a very important role in filtration. A filter element of a filter needs to be replaced regularly. During replacement of the filter element of the filter, in order to avoid environmental pollution caused by engine oil leakage in the removal process, the filter is provided with a fuel return channel, and a fuel return plug arranged on the filter element in structural design. During removal, the fuel return plug of the filter element is removed to fall from the oil return channel, and the oil return channel is opened to discharge engine oil in a filter chamber to an engine oil tank. After the filter element is installed, the fuel return plug needs to close the fuel return channel to maintain engine oil pressure. As a result, during installation of the filter element, the fuel return plug needs to be accurately positioned, installed and sealed together with the fuel return channel.

In the prior art, a liquid filter is disclosed in the U.S. Pat. No. 9,023,203B2.

In a technical solution of the patent, a drive nose and a fuel return plug are integrally arranged on an end cover of a filter element. During installation of the filter element, the drive nose drives the whole filter element to rotate. However, when the filter element has a relatively large size or rotatable match between the filter element and an outer screw cap is locked, the drive nose is easy to wear and even break, such that the filter element cannot be installed correctly. In addition, the filter element in the above existing technical solution cannot rotate along an axial direction after being installed, so when an internal combustion engine works, the filter element positioned at an engine oil inlet is easily damaged by thermal ageing due to long-time high-pressure impact of high-temperature engine oil on a local part thereof.

SUMMARY

In order to solve the technical problems existing in the prior art, the present application provides a filter with a rotating device. By arranging the rotating device, the wear of a drive portion may be reduced during installation, the drive portion is prevented from being broken, and the installation reliability and convenience of this filter are improved; and during operation, a filter element may rotate relative to the rotating device under the flow impact of engine oil, such that the filter element is prevented from being damaged by continuous high-pressure impact of high-temperature engine oil on a local part thereof, and the service life of the filter is prolonged.

To achieve the above objective, the present application adopts the following technical solution:

A filter with a rotating device, including a filter element and the rotating device installed on the filter element. The filter element is provided with a clamping structure matched with the rotating device. The rotating device is provided with an eccentrically arranged fuel return plug, an internal opening for radial limiting, and a drive portion structure arranged at the inner opening. The rotating device is arranged on the filter element and rotatably matched with a lower end cover of the filter element, such that the wear of a drive portion may be reduced during installation, the drive portion is prevented from being broken, and the installation reliability and convenience of this filter are improved; and during operation, the filter element may rotate relative to the rotating device under the flow impact of engine oil, such that the filter element is prevented from being damaged by continuous high-pressure impact of high-temperature engine oil on a local part thereof, and the service life of the filter is prolonged.

Further, the drive portion structure includes the drive portion and a radial limiting surface and is configured to drive a central stand column of the rotating device to rotate.

Further, the filter element includes a central tube and a filter medium arranged around the central tube, and an upper end cover and a lower end cover are respectively connected to two ends of the filter medium. The rotating device is rotatably matched with the lower end cover of the filter element, thereby ensuring that the rotating device may rotate relative to the filter element.

Further, an annular pawl portion is arranged in a manner that an internal opening is formed in the lower end cover and axially extends towards one side in the central tube. The annular pawl portion has elasticity and is configured to connect the rotating device.

Further, a circular ring matched with the annular pawl portion is arranged in a manner that the internal opening of the rotating device axially extends towards one side in the central tube, and the circular ring is externally provided with a clamping portion, such that the match with the annular pawl portion of the lower end cover is facilitated, and the rotating device is prevented from filling from the filter element.

Further, an installation and combination portion matched with a housing assembly is arranged in a manner that the internal opening of the rotating device axially extends towards the other side in the central tube, and the fuel return plug is arranged in a same direction as the installation and combination portion to position and install the filter element.

Further, the fuel return plug is arranged on an outer side of the installation and combination portion.

Further, an upper end of the annular pawl portion abuts against the clamping portion, such that the installation stability of this filter is improved.

Further, the lower end cover is provided with a sealing ring.

Further, the sealing ring is annularly arranged at the internal opening of the lower end cover. The sealing ring is an annular bulge and is configured to implement sealing between the lower end cover of the filter element and the rotating device after installation, and the sealing ring is close to the internal opening, such that a rotational torque between the filter element and the rotating device is reduced.

Compared with the prior art, the present application has the following advantages: the rotating device is arranged on the filter element and rotatably matched with the lower end cover of the filter element, such that the wear of the drive portion may be reduced during installation, the drive portion is prevented from being broken, and the installation reliability and convenience of this filter are improved; and during operation, the filter element may rotate relative to the rotating device under the flow impact of engine oil, such that the filter element is prevented from being damaged by continuous high-pressure impact of high-temperature engine oil on a local part thereof, and the service life of the filter is prolonged.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

In the figures.

Figure 1:
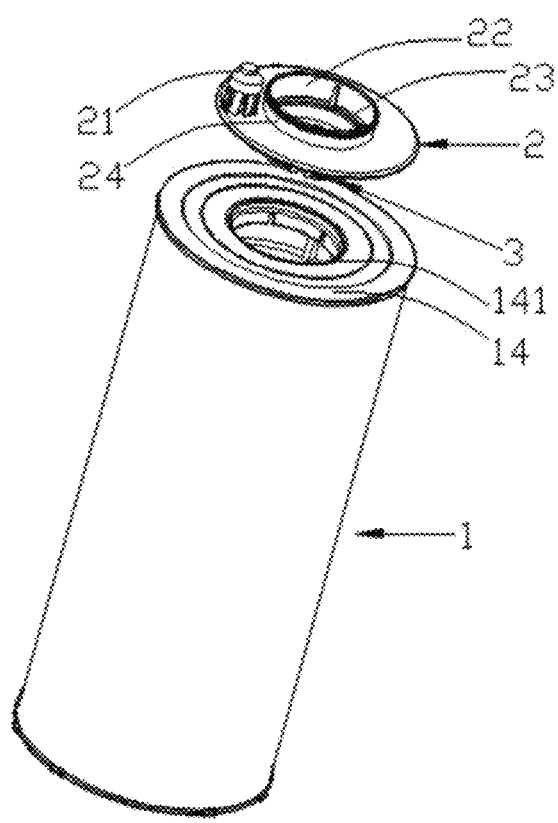
FIG. 1 is an exploded view of an embodiment of a filter with a rotating device provided by the present application.
Figure 2:
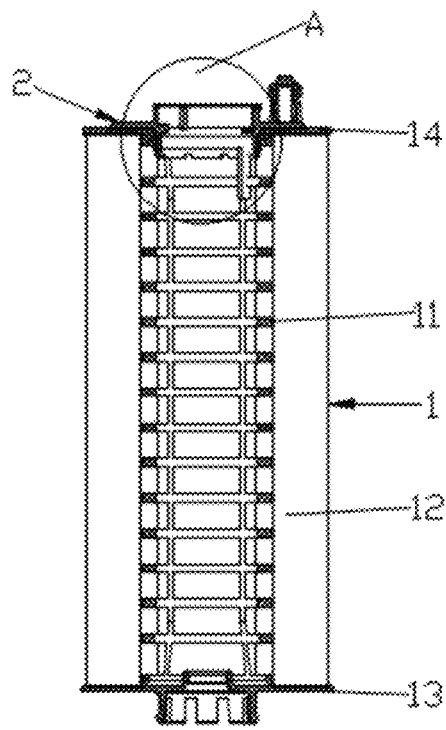
FIG. 2 is a cross-sectional view of an overall structure of an embodiment of a filter with a rotating device provided by the present application.
Figure 3:
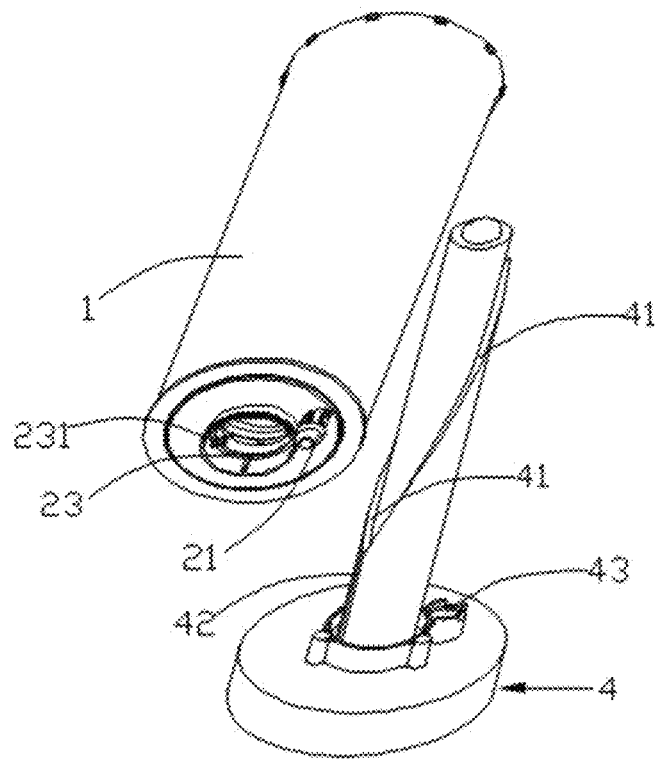
FIG. 3 is a three-dimensional diagram of an embodiment of a filter with a rotating device provided by the present application.
Figure 4:
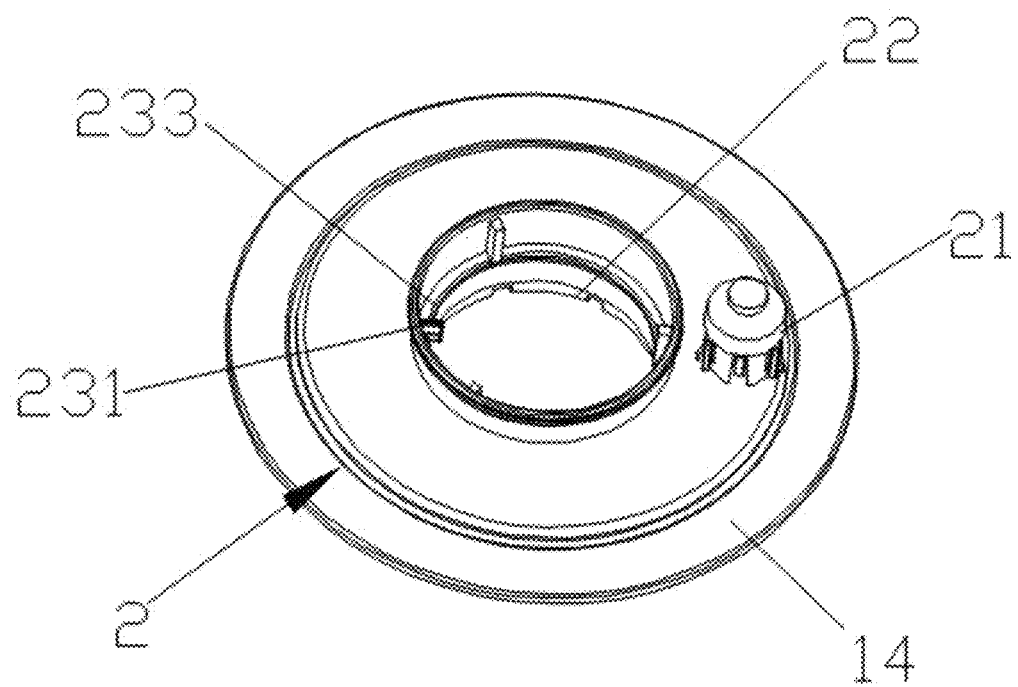
FIG. 4 is a schematic structural diagram of match between a rotating device and a lower end cover in an embodiment of a filter with a rotating device provided by the present application.
Figure 5:
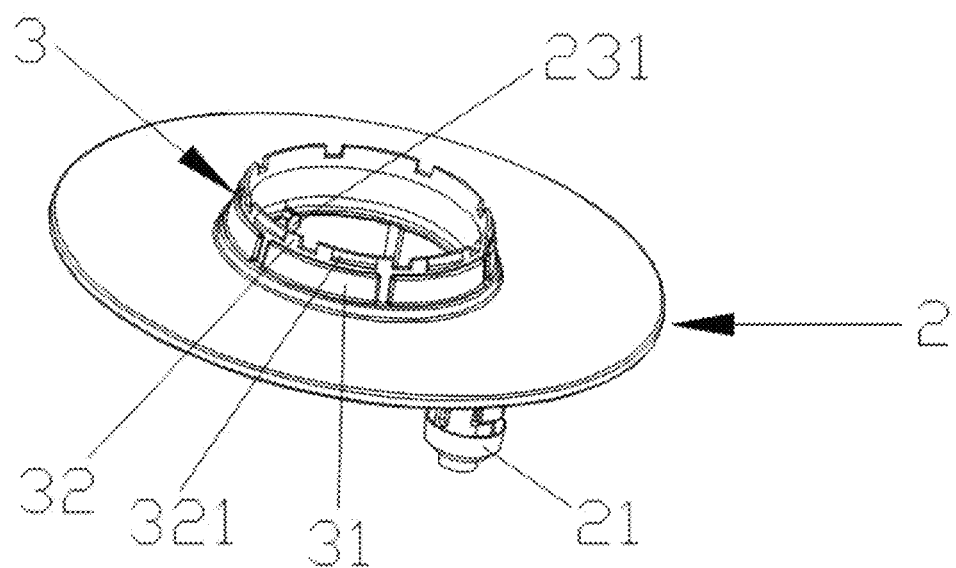
FIG. 5 is a schematic diagram of a local structure in an embodiment of a filter with a rotating device provided by the present application.
Figure 6:
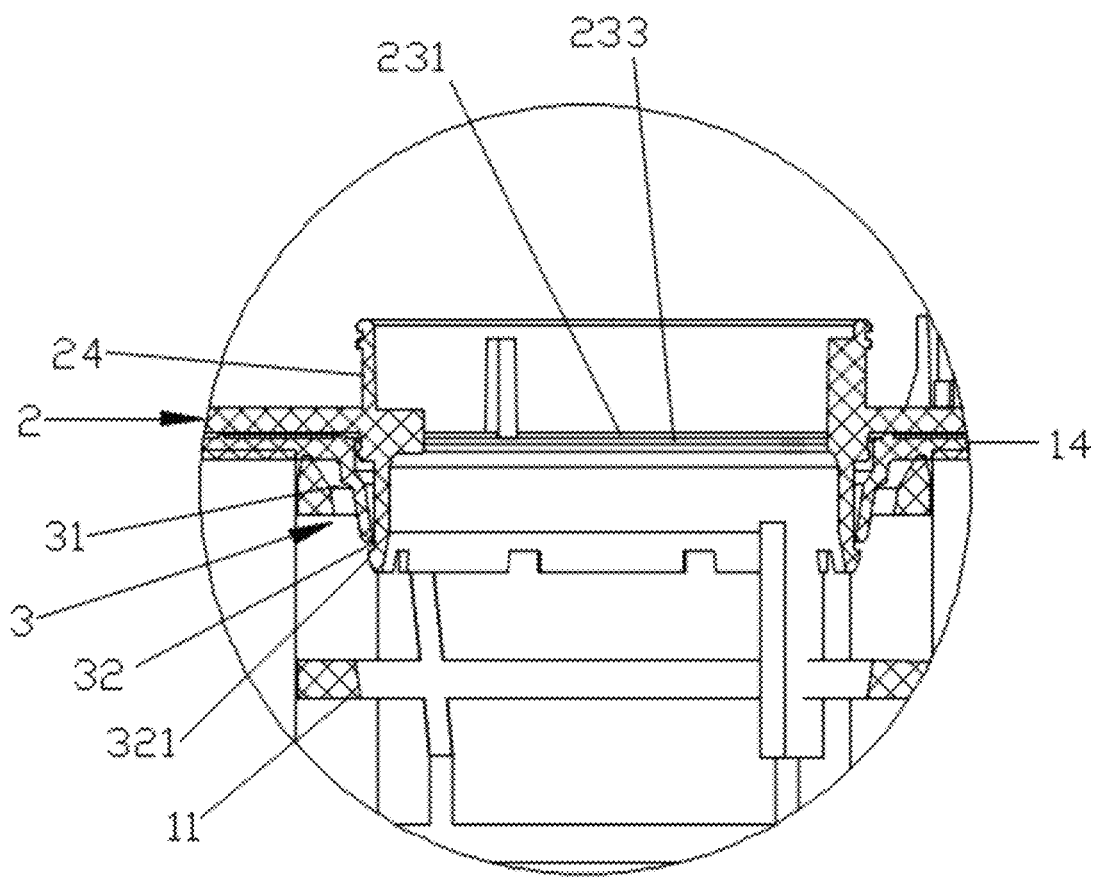
FIG. 6 is an enlarged view of A in FIG. 2 according to an embodiment of a filter with a rotating device provided by the present application.

1: filter element; 11: central tube; 12: filter medium; 13: upper end cover; 14: lower end cover; 141: sealing ring; 2: rotating device; 21: fuel return plug; 22: internal opening; 23: drive portion structure; 231: drive portion; 233: radial limiting surface; 24: installation and combination portion; 3: clamping structure; 31: annular pawl portion; 32: circular ring; 321: clamping portion; 4: central stand column; 41: helical guide surface; 42: positioning groove; and 43: fuel return hole.

DETAILED DESCRIPTION

The embodiments of the present application are described in detail below, and the examples of the embodiments are shown in the accompanying drawings. The embodiments described below with reference to the accompanying drawings are exemplary and intended to explain the present application, and should not be construed as a limitation to the present application.

In the description of the present application, it should be understood that the orientational or positional relationships indicated by the terms "center", "longitudinal", "transverse", "length", "width", "thickness", "upper", "lower", "front", "back", "left", "right", "vertical", "horizontal", "top", "bottom", "inside", "outside", etc. are based on the orientational or positional relationships shown in the accompanying drawings, are only used for the convenience of describing the present application and simplifying the description rather than indicating or implying that the referred device or element must have a specific orientation or be constructed and operated in a specific orientation, and therefore should not be construed as a limitation to the present application.

In addition, the terms "first" and "second" are only used for descriptive purposes, and should not be construed as indicating or implying relative importance or implying the number of indicated technical features. Thus, the features limited with "first" and "second" may explicitly or implicitly include at least one of the features. In the description of the present application, "a plurality of" means at least two, such as two, three, etc., unless otherwise expressly and specifically limited.

In the present application, the terms "installed", "connected", "connection", "fixed", etc. should be understood in a broad sense, unless otherwise expressly specified and limited. For example, it may be a fixed connection, a detachable connection, or integrated; it may be a mechanical connection, an electrical connection, or a mutual communication; and it may be directly connected, indirectly connected via an intermediate medium, an internal connection between two elements, or an interactive relationship between the two elements, unless otherwise expressly limited. Those of ordinary skill in the art may understand specific meanings of the above terms in the present application according to specific circumstances.

Referring to FIGS. 1 to 6 that show an embodiment of a filter with a rotating device in the present application, in this embodiment, the filter includes a filter element 1 and a rotating device 2. The above filter element 1 is configured to filter out debris in fuel. The above rotating device 2 is installed on the above filter element 1. The above filter element 1 includes a central tube 11 and a filter medium 12 arranged around in the above central tube 11. Two ends of the above filter medium 12 are respectively provided with an upper end cover 13 and a lower end cover 14. The above rotating device 2 is rotatably matched with the above filter element 1. The above filter element 1 is provided with a clamping structure 3 matched with the above rotating device 2. The above rotating device 2 is provided with a fuel return plug 21, an internal opening 22, and a drive portion structure 23. The fuel return plug 21 is eccentrically arranged. The drive portion structure 23 is configured for radial limiting. The drive portion structure 23 is arranged at the above inner opening 22. The rotating device 2 is rotatably matched with the lower end cover 14 of the filter element 1, such that the drive portion 231 is not easily worn, and the drive portion 231 is prevented from being broken. The internal opening 22 and the eccentrically arranged fuel return plug 21 are configured to guide correct installation of the filter element 1. Meanwhile, the filter element 1 may rotate relative to the rotating device 2 under the flow impact of engine oil, such that the filter element 1 is prevented from being damaged by continuous high-pressure impact of high-temperature engine oil on a local part thereof, and the durability of the filter element 1 is improved.

In this embodiment, the above drive portion structure 23 includes a drive portion 231 and a radial limiting surface 233. The drive portion 231 is configured to drive and guide correct installation of the filter element 1, and the radial limiting surface 233 is configured for radial limiting.

In this embodiment, the above clamping structure 3 includes an annular pawl portion 31, a circular ring 32, and a clamping portion 321 arranged outside the circular ring 32. The annular pawl portion 31 is formed in a manner that the above lower end cover 14 is formed with an internal opening and axially extends towards one side in the above central tube 11. The circular ring 32 is formed in a manner that the internal opening 22 of the above rotating device 2 axially extends towards one side in the central tube 11. The circular ring 32 is matched with the annular pawl portion 31 to stabilize a state in which the rotating device 2 is rotatably matched with the lower end cover 14. An upper end of the annular pawl portion 31 abuts against the above clamping portion 321 to stabilize a state in which the circular ring 32 is matched with the annular pawl portion 31. In consequence, the sealing between the above lower end cover 14 and the above rotating device 2 is improved.

In this embodiment, an installation and combination portion 24 matched with a housing assembly (not shown in figure) is arranged in a manner that the internal opening 22 of the above rotating device 2 axially extends towards the other side in the central tube 11, the above fuel return plug 21 is arranged on an outer side of the above installation and combination portion 24, and the above fuel return plug 21 is arranged in a same direction as the above installation and combination portion 24, thereby facilitating correct positioning and installation of the filter element 1. During installation, the drive portion 231 of the rotating device 2 slides along a helical guide surface 41 on a central stand column 4 of the housing assembly, and drives the rotating device 2 to rotate until the drive portion 231 enters a positioning groove 42, thereby guiding aligned installation of the fuel return plug 21 and a fuel return hole 43.

Referring to FIG. 1, in this embodiment, the above lower end cover 14 is provided with a sealing ring 141, and the above sealing ring 141 is annularly arranged at the internal opening of the above lower end cover 14. The above sealing ring is an annular bulge for improving the sealing between the above lower end cover 14 and the above rotating device 2.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. A filter with comprising a rotating device, comprising a filter element and the rotating device installed on the filter element, the filter element being provided with a clamping structure matched with the rotating device, and the rotating device being provided with an eccentrically arranged fuel return plug, an internal opening for radial limiting, and a drive portion structure arranged at the inner opening;

wherein the filter element comprises a central tube and a filter medium arranged around the central tube, and an upper end cover and a lower end cover are respectively connected to two ends of the filter medium;

wherein an annular pawl portion is arranged in a manner that an internal opening is formed in the lower end cover and axially extends towards one side in the central tube;

wherein a circular ring matched with the annular pawl portion is arranged in a manner that the internal opening of the rotating device axially extends towards one side in the central tube, and the circular ring is externally provided with a clamping portion;

wherein the clamping structure includes an annular pawl portion, a circular ring and a clamping portion arranged outside the circular ring, the annular pawl portion is formed in a manner that the lower end cover is formed with an internal opening and axially extends towards one side in the above central tube, the circular ring is formed in a manner that the internal opening of the above rotating device axially extends towards one side in the central tube the circular ring is matched with the annular pawl portion to stabilize a state in which the rotating device is rotatably matched with the lower end cover, an upper end of the annular pawl portion abuts against the above clamping portion to stabilize a state in which the circular ring is matched with the annular pawl portion in consequence, the sealing between the lower end cover and the above rotating device is improved; and wherein an upper end of the annular pawl portion abuts against the clamping portion.

2. The filter comprising a rotating device according to claim 1, wherein the drive portion structure comprises a drive portion and a radial limiting surface.

3. The filter comprising a rotating device according to claim 1, wherein an installation and combination portion matched with a housing assembly is arranged in a manner that the internal opening of the rotating device axially extends towards the other side in the central tube, and the fuel return plug is arranged in a same direction as the installation and combination portion.

4. The filter comprising a rotating device according to claim 3, wherein the fuel return plug is arranged on an outer side of the installation and combination portion.

5. The filter comprising a rotating device according to claim 1, wherein the lower end cover is provided with a sealing ring.

6. The filter comprising a rotating device according to claim 5, wherein the sealing ring is annularly arranged at an internal opening of the lower end cover.

* * * * *